United States Patent [19]
White

[11] Patent Number: 5,180,458
[45] Date of Patent: Jan. 19, 1993

[54] METHOD OF LINING OF METALLIC PIPE USING A PLURALITY OF CONCENTRIC FLEXIBLE TUBES OF THERMOPLASTIC POLYMER

[75] Inventor: George White, Glenburnie, Canada

[73] Assignee: Du Pont Canada, Inc., Mississauga, Canada

[21] Appl. No.: 692,159

[22] Filed: Apr. 26, 1991

[30] Foreign Application Priority Data

May 2, 1990 [GB] United Kingdom ............. 9009899

[51] Int. Cl.$^5$ ............................................. B29C 63/34
[52] U.S. Cl. ........................ 156/87; 156/287; 156/294
[58] Field of Search .............. 156/87, 156, 287, 294, 156/327, 334; 264/269, 516, 573; 138/97, 98

[56] References Cited

U.S. PATENT DOCUMENTS

| | | | |
|---|---|---|---|
| 2,724,672 | 11/1955 | Ruben | 154/82 |
| 2,794,758 | 6/1957 | Harper et al. | 156/287 |
| 2,881,093 | 4/1959 | Buell | 117/94 |
| 3,132,062 | 5/1964 | Lang et al. | 156/294 |
| 3,307,996 | 3/1967 | Keneipp, Jr. | 156/287 |
| 3,511,734 | 5/1970 | Darrow | 156/294 |
| 3,560,295 | 2/1971 | Kimbrell et al. | 156/287 |
| 4,009,063 | 2/1977 | Wood | 156/294 |
| 4,681,783 | 7/1987 | Hyodo et al. | 156/287 |
| 4,687,677 | 8/1987 | Jonasson | 156/272.2 |
| 4,865,673 | 9/1989 | Shishkin et al. | 156/287 |
| 5,034,180 | 7/1991 | Steketee | 264/516 |

FOREIGN PATENT DOCUMENTS

| | | | |
|---|---|---|---|
| 531102 | 10/1954 | Canada . | |
| 1241262 | 8/1980 | Canada . | |
| 0008748 | 4/1075 | Japan | 156/87 |
| 0018233 | 6/1970 | Japan | 156/287 |
| 0037677 | 11/1970 | Japan | 156/294 |
| 0017671 | 2/1978 | Japan | 156/87 |
| 112977 | 9/1979 | Japan | 156/294 |
| 0148071 | 11/1979 | Japan | 156/294 |
| 2200712 | 8/1988 | United Kingdom | 156/294 |

*Primary Examiner*—Michael W. Ball
*Assistant Examiner*—Steven D. Maki

[57] ABSTRACT

A method of lining of metallic pipe is disclosed. The method comprises forming a plurality of concentric flexible tubes of a thermoplastic polymer, such tubes being capable of being bonded together under the influence of heat and pressure. The plurality of concentric tubes is inserted into a section of metallic pipe that is to be lined. The tubes are then heated, especially under pressure e.g. using steam, to cause the tubes to bond together to form a single tube lining the pipe. Adhesives may be used to facilitate bonding. The method is particularly useful in the lining of metallic pipe that has bends, loops or the like.

6 Claims, 2 Drawing Sheets

METHOD OF LINING OF METALLIC PIPE USING A PLURALITY OF CONCENTRIC FLEXIBLE TUBES OF THERMOPLASTIC POLYMER

The present invention relates to a method for the lining of metallic pipe with a thermoplastic polymer, using a plurality of concentric flexible tubes formed from the thermoplastic polymer in which the concentric tubes are pulled through a length of metallic pipe and then inflated to form a lining in the pipe.

Metallic pipe, especially steel pipe, is used in the transportation of fluids. A primary example is the use of steel pipelines for the transportation of petroleum products, including crude oil and petroleum gases. Crude oil may contain brine, and in some instances contains 70-90% brine. Such pipelines may be used to transport fluids over long distances through harsh terrain e.g. the transportation of petroleum products from the Arctic. Pipelines are susceptible to corrosion, for example as a result of moisture and acidic materials in the petroleum products, which can severely limit the useful life of a pipeline.

Pipelines may be protected by lining the metallic pipe with a thermoplastic polymer, and use of a variety of polymers is known in the art. Canadian 531 102 of J. M. Reilly, issued Oct. 2, 1985 relates to the lining of rigid pipe with an elastic thermoplastic material. U.S. Pat. No. 2,724,672 of L. C. Rubin, which issued Nov. 22, 1955, describes the lining of metal pipe with fluorocarbon polymers. The lining of metal pipe with polyvinylchloride is described in U.S. Pat. No. 3,560,295 of W. B. Kimbrell et al., which issued Feb. 2, 1971. The lining of pipe with, in particular, polyethylene is described in Canadian 1 241 262 of A. D. Whyman and D. A. Kneller, which issued Aug. 30, 1988.

The lining of metallic pipe with a polymer is normally carried out by inserting a pipe of suitable diameter formed from the thermoplastic polymer into the metallic pipe, usually by pulling the thermoplastic polymer pipe through the metallic pipe. This method may be practical when the metallic pipe is substantially linear pipe, but it may be impractical, or inoperable, when the metallic pipe has bends, loops or the like. In such instances it is necessary to sever the metallic pipe into lengths that are substantially linear in nature, and to then re-join the metallic pipe after the liner has been inserted. The bends, loops and the like in the metallic pipe also require lining, and all of the lined sections of pipe must then be joined in a manner that is not unduly susceptible to corrosion during subsequent use. Minimising the number of joints in the lined pipe would be of significant advantage.

It has now been found that metallic pipe may be lined using a plurality of concentric flexible tubes formed from thermoplastic polymers.

Accordingly, the present invention provides a method of lining a metallic pipe comprising:

(a) forming a plurality of concentric flexible tubes of thermoplastic polymer, said tubes being capable of being bonded together under the influence of heat and pressure;

(b) inserting the plurality of concentric tubes into a section of metallic pipe;

(c) inflating the tubes using a fluid under pressure; and (d) heating the tubes within the pipe to cause the tubes to be bonded together to form a single tube lining said metallic pipe.

In a preferred embodiment of the method of the present invention, the concentric tubes are also bonded to the metallic pipe, to the interior surface thereof.

In another embodiment, the tubes are coated with an adhesive that is activated under the influence of heat.

In a further embodiment, the polymer used to form each of the flexible concentric tubes is the same.

In a further embodiment, the flexible concentric tubes are formed from at least two different polymers.

In yet another embodiment, steps (c) and (d) are carried out simultaneously.

The present invention will be particularly described with reference to the embodiments shown in the drawings, in which.

Figure 1:
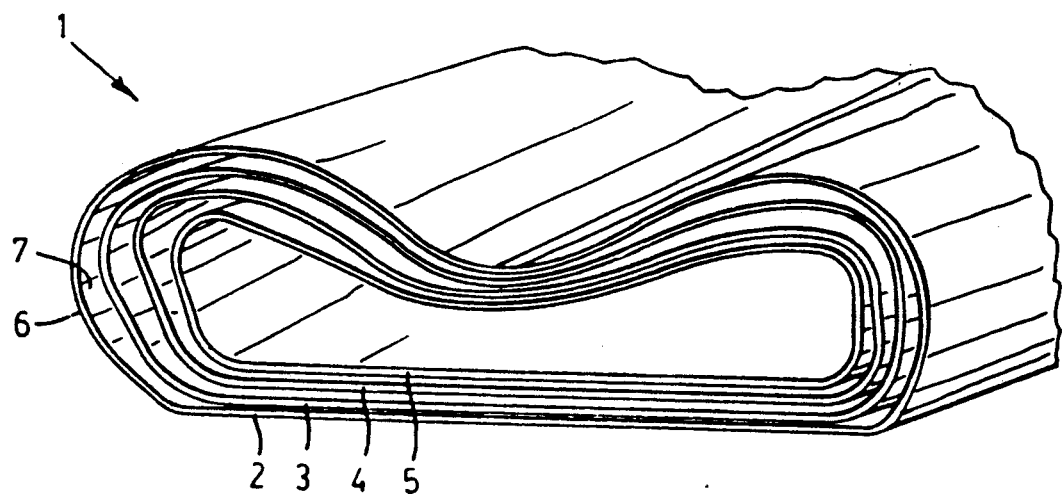
FIG. 1 is a schematic representation of a plurality of flexible concentric tubes.

FIG. 1 shows a plurality of flexible concentric tubes, generally shown by 1, that are formed from a thermoplastic polymer. The plurality of tubes 1 is formed from individual tubes, indicated by 2, 3, 4 and 5; it is to be understood that the number of tubes may be varied over a wide range. Outer tube 2 is shown to have an outer coating 6 of an adhesive and an inner coating 7 of an adhesive, the adhesives being the same or different. Similarly, at least one surface of each of films 3, 4 and 5 would be coated with an adhesive, such that at least one surface of each pair of surfaces of the tubes in contact or in a face-to-face relationship would be coated with an adhesive. It is to be understood that the inner surface of tube 5 i.e. the surface that would be the inside of the lining subsequently formed in the metallic pipe, would normally not be coated with an adhesive.

Figure 2:
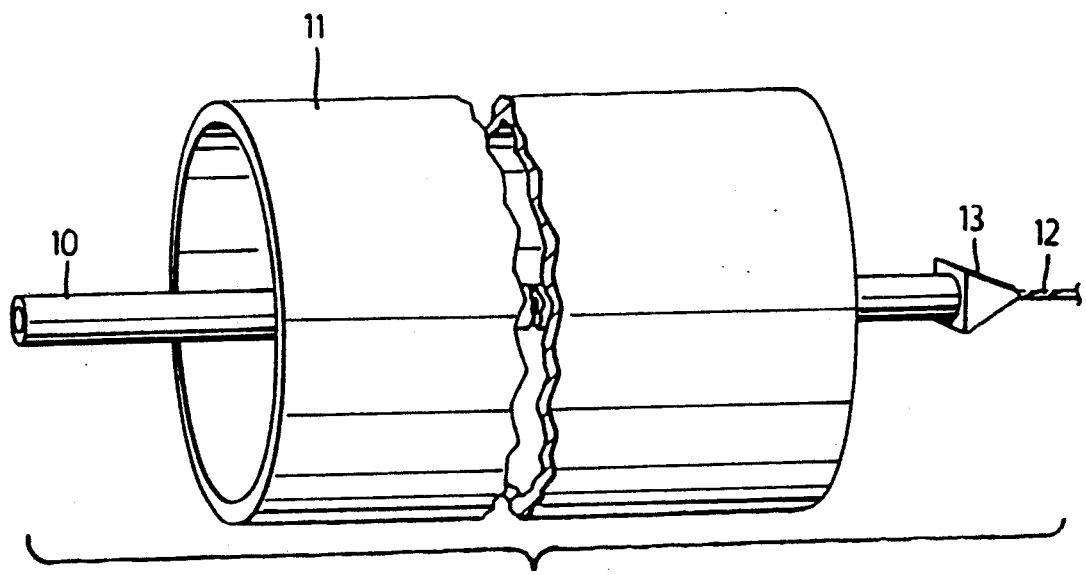
FIG. 2 is a schematic representation of a plurality of flexible concentric tubes being pulled through a section of metallic pipe.

FIG. 2 shows a plurality of concentric tubes, indicated by 10, being pulled through a metallic pipe indicated by 11. The diameter of the metallic pipe 11 would normally be greater than the diameter of the collapsed plurality of tubes 10, although it might be only slightly so. The tubes 10 are being pulled by means of rope 12 which is connected to the tubes by means of clamp 13.

Figure 3:
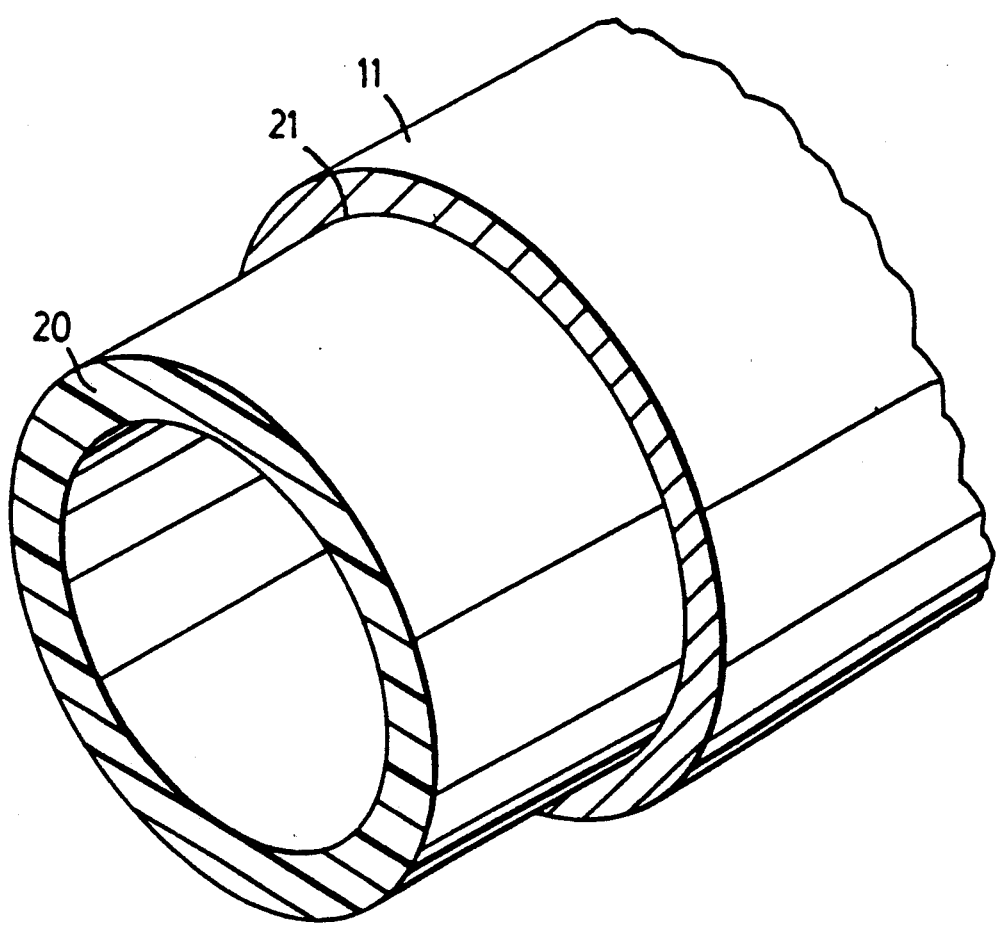
FIG. 3 is a schematic representation of a metallic pipe lined with the plurality of flexible tubes.

FIG. 3 shows metallic pipe 11 having an internal liner 20 formed from thermoplastic polymer. In preferred embodiments liner 20 is bonded to the inner surface 21 of metallic tube 11. Liner 20 although formed from a plurality of concentric tubes is in the form of a single entity.

In operation, a plurality of concentric tubes are formed. The tubes would normally be of identical or substantially identical diameter, such that when inflated the surface of any one tube would be in contact with the immediately adjacent surface of the juxtaposed tube. Each tube would normally be coated with an adhesive that was capable of effecting bonding between the tubes under the influence of heat and pressure; this may be important as after the bundle of tubes are bonded together, the bonded tubes forming the liner will tend to be rigid, with the result that the liner will not collapse into the pipe when pressure is removed from the interior of the pipe even if the liner is not bonded to the internal wall of the pipe.

The individual tubes may be formed from the same polymer or formed from different polymers; thus, the plurality of concentric tubes could be formed from the same polymer or from two or more polymers. The use of different polymers would facilitate the incorporation of barrier or other properties into the liner that is to be formed within the metallic pipe. The plurality of tubes may be formed in a number of ways e.g. by pulling one tube through another tube in a sequence of steps, or substantially simultaneously, or by spiral winding continuous strips of film around a tube. If the outer tube has not been coated on the outside with an adhesive, and if it is desired to do so, the adhesive may be applied prior to forming the plurality of concentric tubes or subsequent to the formation thereof.

The plurality of concentric tubes are then pulled through a length of metallic pipe. The metallic pipe may be a substantially linear section of pipe, possibly of considerable length. Alternatively, the pipe may have one or more bends in it, including elbows, loops and the like, which are required in order to conform the pipeline to contours of the ground over which or through which it is travelling, to allow for expansion and contraction between different periods of the year and/or to allow for expansion and contraction as a result of changes in the temperature of material passing through the pipeline. After the tube has been pulled through the section of metallic pipe, the tube is then inflated with fluid. The fluid may be a gas e.g. air or steam, or it may be a liquid e.g. water. The preferred fluid is steam. In embodiments, the fluid is a heated fluid so that the expansion of the flexible tube and the heating of the tube to effect bonding of the layers of tube together are carried out simultaneously. If the tube is expanded using a cool fluid, then in a subsequent step the tube needs to be heated in order to bond the layers together. The resultant lined metallic pipe has a liner that is essentially a single entity, not remaining a plurality of tubes.

In embodiments of the invention that are not shown in the drawings, some and preferably each of the plurality of concentric tubes has spaced-apart, especially widely spaced-apart, randomly located perforations. Such perforations are intended to permit fluid, especially air, between the concentric tubes to bleed from between the tubes during the step of expansion of the concentric tubes to form the liner and thereby reduce an likelihood of rupture of the liner during formation due to excess pressure of fluid between concentric tubes. The perforations should be spaced apart to reduce the likelihood of defects or weak spots in the liner due to overlaying perforations, but should not be so widely spaced that fluid cannot bleed from between the concentric tubes during the expansion step.

The pipe that may be lined using the method of the present invention is a metallic pipe, especially a steel pipe. In preferred embodiments, the pipe is formed from a carbon steel or other steel used in the formation of pipelines, especially pipelines used for the transportation of petroleum products.

The concentric tubes are formed from thermoplastic polymer, especially a thermoplastic polymer that is corrosion resistant with respect to the intended end use of the lined pipe. In preferred embodiments, the tubes are formed from polyethylene, especially a copolymer of ethylene and a $C_4$-$C_{10}$ higher alpha-olefin. The thermoplastic polymer may also be a polyamide, examples of which are nylon 11, nylon 12 and nylon 12/12. In embodiments, especially for pipelines used in the transportation of crude oil, the preferred polymer is nylon 12/12.

A variety of adhesives may be used, the requirements being that the adhesive may be coated onto the tubes prior to formation of the concentric tubes without bonding those tubes together so as to lose flexibility of the tubes prior to insertion of the concentric tubes into the metallic pipe, and that the adhesive may be subsequently activated to effect bonding together of the concentric tubes e.g. under the influence of heat and pressure. In preferred embodiments, the adhesive is a grafted polyolefin, examples of which include polyolefins grafted with polar monomers.

The polyolefin, of the grafted polyolefin, may be a homopolymer of a $C_2$-$C_8$ hydrocarbon alpha-olefin or a copolymer of such an alpha-olefin with a $C_3$-$C_8$ hydrocarbon alpha-olefin. Examples of such polymers are homopolymers of ethylene and propylene and copolymers of ethylene with propylene, butene-1, hexene-1 and octene-1. Alternatively, the polymer may be a copolymer of ethylene and a vinyl alkanoate, especially ethylene/vinyl acetate copolymers, or a copolymer of ethylene and a (meth)acrylate ester, examples of which are ethylene/ethyl acrylate copolymers, ethylene/methyl acrylate copolymers, ethylene/butyl acrylate copolymers and ethylene/methyl methacrylate. Other copolymers include copolymers of ethylene with acrylic acid or methacrylic acid, and analogous ionomers viz. copolymers having the acid groups thereof partially neutralized by metals especially with sodium, zinc or aluminum. Additionally, the copolymer may be a copolymer of ethylene with carbon monoxide, optionally also with one of the aforementioned monomers, examples of which are ethylene/carbon monoxide, ethylene/butyl acrylate/carbon monoxide, and ethylene/vinyl acetate/carbon monoxide copolymers. Such copolymers are known in the art and many examples thereof are available commercially.

The polymers are available in a variety of molecular weights, which is usually expressed in terms of melt index. Melt index is measured by the procedure of ASTM D-1238 (condition E). Polymers with a wide range of melt indices may be used.

The grafting monomer is selected from the group consisting of ethylenically unsaturated carboxylic acids and ethylenically unsaturated carboxylic acid anhydrides, including derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride or citraconic anhydride, nadic anhydride, nadic methyl anhydride and tetrahydro phthalic anhydride. Examples of derivatives of the unsaturated acids are salts, amides, imides and esters e.g. mono- and disodium maleate, acrylamide, maleimide, glycidyl methacrylate and diethyl fumarate.

The amount of monomer will depend in particular on the reactivity of the monomer and the level of grafting that is to be achieved. For example, if the monomer is maleic anhydride, the amount of monomer may be as high as about 5%, especially 0.1-3%, by weight of the copolymer, and particularly in the range of 0.2-2% by weight. With other monomers, different amounts of monomer may be preferred.

Grafted polymers of the type described above are available commercially e.g. from Du Pont Canada Inc.

The use of grafted polyolefins with tubes formed from polyamides has the advantage of providing the liner with barrier properties to hydrocarbons through the use of the polyamide and to polar materials e.g. water and methanol, through the use of the grafted polyolefin. Such a combination of tubes and adhesive may afford increased protection against corrosive substances. The use of adhesives permits the bonding of adjacent tubes to be achieved without the need to heat the liner to a temperature above the softening point of the polymer. Use of an appropriate adhesive permits the bonding to be achieved over a range of temperatures to reflect process requirements and the heating means that may be available at any particular installation site.

A plurality of tubes is used in the process of the present invention, depending in particular on the required thickness of the liner, practical considerations e.g. the formation of the concentric tubes from individual tubes and the required flexibility of the concentric tubes especially during insertion into the metallic pipe, and the particular construction of the resultant plurality of tubes. The thickness of the individul tubes may be varied over a wide range e.g. from 40 microns to 800 microns, preferably 75 to 250 microns. The total thickness of the liner may vary over a range of 0.1 to 2.5 cm, and preferably 0.25 to 1.0 cm. The number of tubes used is varied in accordance with film and liner thickness, but in preferred embodiments is in the range of 5 to 50 and especially 10 to 25.

The method of the present invention may be used for the lining of metallic pipes, especially such pipes in the form of a pipeline. In particular, the method may be used for the lining of pipelines in situ, without the need to eliminate bends, loops or the like from the section of the pipeline that is to be lined. The method may be used to construct a liner from a variety of flexible tubes i.e. tubes formed from a variety of thermoplastic polymers, while still permitting the liner to be pulled through long lengths of straight metallic pipe as well as through elbows, bends and the like. The liner formed from the flexible tubes may then be converted into a rigid liner by the application of heat and pressure.

The present invention is illustrated by the following example:

EXAMPLE I

To illustrate the effect on physical properties of use of multiple layers of flexible film to form the liner, the compression strength and bending strength for a series of liners were measured. Compression strength was measured in an Instron apparatus by placing the sample of liner between the platens of the Instron apparatus; compression strength was defined as the force required to compress the liner by 2.5 cm. Bending strength was measured in an Instron apparatus, and was defined as the force required to bend a length of liner extending 37.5 cm from a fulcrum through an angle of 90°.

The results obtained were as follows:

TABLE I

| Run* | Compression Strength (kg) | Thickness of Layers (microns) Bending Strength (kg) | Thickness (mm) | No. of Layers Strength (kg) | Total, Thickness (mm) Strength (kg) |
|---|---|---|---|---|---|
| A | 3175 | 1 | 3.2 | — | 388** |
| B | 380 | 6 | 2.3 | 9.9 | 19 |
| C | 255 | 10 | 2.6 | 7.9 | 11 |
| D | 130 | 20 | 2.6 | 4.2 | 2.2 |
| E | 75 | 33 | 2.5 | 1.8 | 0.73 |

*A = polyvinyl chloride (comparative)
B = nylon 12/12
C = nylon 12/12
D = nylon 12/12
E = nylon 12/12

The results show that use of multiple layers gave substantially lower bending and compression strength, even though the total thickness was similar. This indicates that the multiple layers would be more readily inserted into a pipeline in order to form a liner.

I claim:

1. A method of lining of metallic pipe consisting essentially of:
   (a) forming a plurality of at least five concentric flexible tubes from film of thermoplastic polymer, said thermoplastic polymer being selected from the group consisting of polyethylene and polyamide, said tubes having a coating of grafted polyolefin on at least one surface thereof such that in the plurality of concentric tubes at least one tube surface in face-to-face relationship with another tube surface has said coating thereon;
   (b) simultaneously inserting each flexible tube into a section of metallic pipe by pulling said plurality of tubes into the pipe;
   (c) inflating the tubes using a fluid under pressure; and
   (d) heating the tubes within the pipe to cause the tubes to be bonded together to form a single tube lining said metallic pipe; each tube of the plurality of tubes having a thickness in the range of about from 40 to 800 microns, and the thickness and number of tubes being selected to provide said single tube with a total thickness of about from 0.1 to 2.5 cm.

2. The method of claim 1 in which the pipe concentric tubes are also bonded to the metallic pipe, to the interior surface thereof.

3. The method of claim 1 in which the polymer used to form each of the flexible concentric tubes is the same.

4. The method of claim 1 in which the polymer used to form each of the flexible concentric tubes is different.

5. The method of claim 1 in which steps (c) and (d) are carried out simultaneously.

6. The method of claim 1 in which each concentric tube contains randomly-located perforations that are spaced apart.

* * * * *